United States Patent
Billington et al.

(10) Patent No.: US 7,103,760 B1
(45) Date of Patent: Sep. 5, 2006

(54) EMBEDDED ELECTRONIC DEVICE CONNECTIVITY SYSTEM

(76) Inventors: Corey A. Billington, 1072 Warren Ave., San Jose, CA (US) 95126; Judith Glazer, 789 Berry Ave., Los Altos, CA (US) 94024; Jerry B. Ortkiese, 469 Madison Dr., San Jose, CA (US) 95123

( * ) Notice: Subject to any disclaimer, the term of this patent is extended or adjusted under 35 U.S.C. 154(b) by 0 days.

(21) Appl. No.: 09/907,212

(22) Filed: Jul. 16, 2001

(51) Int. Cl.
*H04N 5/225* (2006.01)

(52) U.S. Cl. ............... 713/1; 710/62; 399/87; 399/107; 399/110; 399/405; 455/556.1

(58) Field of Classification Search ............ 710/72, 710/62; 345/168, 180, 202, 211; 320/115; 455/556.1; 713/1; 399/87, 107, 110, 405
See application file for complete search history.

(56) References Cited

U.S. PATENT DOCUMENTS

| | | |
|---|---|---|
| 5,099,346 A | 3/1992 | Lee et al. |
| 5,247,380 A | 9/1993 | Lee et al. |
| 5,421,012 A | 5/1995 | Khoyi et al. |
| 5,485,458 A * | 1/1996 | Oprescu et al. ............ 370/409 |
| 5,596,723 A | 1/1997 | Romohr |
| 5,659,459 A * | 8/1997 | Wakabayashi et al. ...... 361/753 |
| 5,870,080 A * | 2/1999 | Burnett et al. ............. 345/163 |
| 5,945,981 A * | 8/1999 | Paull et al. ................. 345/180 |
| 5,968,147 A | 10/1999 | Polfer et al. |
| 5,982,614 A | 11/1999 | Reid |
| 6,052,380 A | 4/2000 | Bell |
| 6,081,356 A | 6/2000 | Branc et al. |
| 6,147,682 A * | 11/2000 | Kim ........................... 345/211 |
| 6,170,026 B1 | 1/2001 | Kimura et al. |
| 6,252,614 B1 | 6/2001 | Mullin |
| 6,255,800 B1 * | 7/2001 | Bork .......................... 320/115 |
| 6,304,250 B1 * | 10/2001 | Yang et al. ................. 345/168 |
| 6,323,886 B1 * | 11/2001 | Watanabe .................... 345/856 |
| 6,327,613 B1 | 12/2001 | Goshey et al. |
| 6,366,450 B1 * | 4/2002 | Janicek ....................... 361/680 |
| 6,405,049 B1 * | 6/2002 | Herrod et al. .............. 455/517 |
| 6,473,783 B1 | 10/2002 | Goshey et al. |
| 6,476,795 B1 * | 11/2002 | Derocher et al. ........... 345/163 |
| 6,711,419 B1 * | 3/2004 | Mori ......................... 455/556.1 |
| 2001/0016889 A1 | 8/2001 | Kikinis |
| 2002/0029311 A1 | 3/2002 | Joyeau et al. |
| 2002/0031099 A1 | 3/2002 | Cookman et al. |
| 2002/0042851 A1 | 4/2002 | Lochner et al. |
| 2002/0054321 A1 | 5/2002 | Kikuchi |
| 2002/0071035 A1 * | 6/2002 | Sobol .......................... 348/207 |
| 2002/0077067 A1 | 6/2002 | Lochner et al. |
| 2002/0085361 A1 | 7/2002 | Wachel |
| 2002/0091826 A1 | 7/2002 | Comeau et al. |
| 2002/0138548 A1 | 9/2002 | Neebe et al. |
| 2002/0194180 A1 | 12/2002 | Alsop et al. |

(Continued)

FOREIGN PATENT DOCUMENTS

EP     0987619     3/2000

(Continued)

*Primary Examiner*—A. Elamin

(57) ABSTRACT

An embedded electronic device connectivity system configured for extending functionality of a peripheral device, including at least two data connections incorporated in the peripheral device, configured to connect the peripheral device to at least two other devices simultaneously, allowing transfer of data between the said at least two devices when so connected; and, a DC power connection incorporated in the peripheral device enabling at least one of the two other devices to be powered from the peripheral device when connected.

7 Claims, 5 Drawing Sheets

U.S. PATENT DOCUMENTS

2003/0005186 A1   1/2003   Gough

FOREIGN PATENT DOCUMENTS

| GB | 0949804 A2 * | 10/1999 |
| WO | WO 92/18924 | 10/1992 |
| WO | WO 01/16686 | 3/2000 |

* cited by examiner

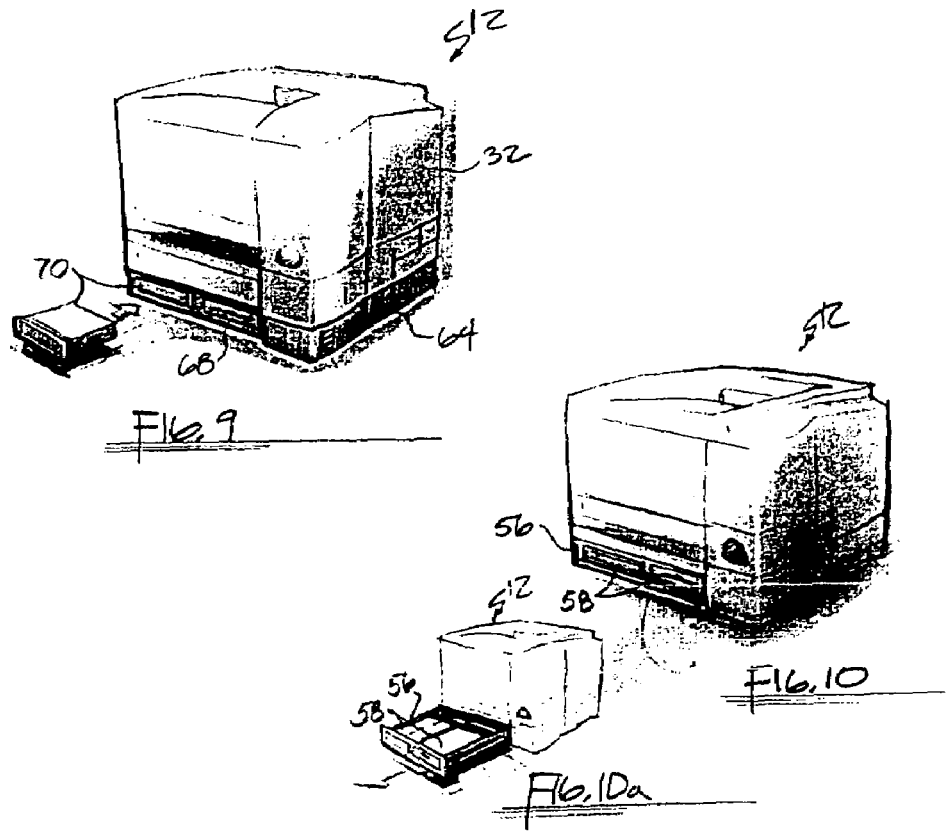
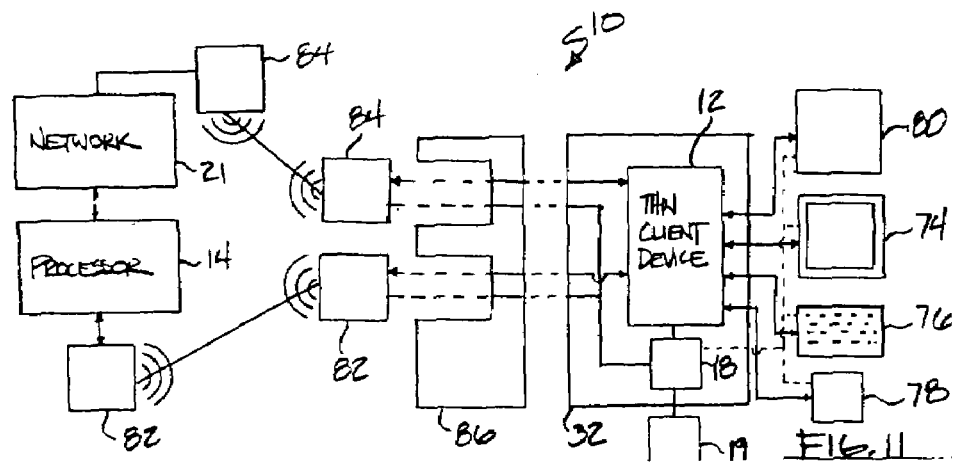

EMBEDDED ELECTRONIC DEVICE CONNECTIVITY SYSTEM

BACKGROUND OF THE INVENTION

1. Field of Invention

The invention relates generally to information systems. More specifically, the invention relates to configuring devices and systems to accommodate and provide more convenient connectivity between various devices such as computers, peripherals, mobile devices, wireless devices, image capture devices, data storage devices, etc. to enhance their functionality and leverage their usefulness in a number of environments, including, but not limited to, office, mobile office, home, networked computing in networks of all sizes, portable device integration, and wireless network environments.

2. Description of Related Art

In data processing systems, such as personal computers (PCs), networked PCs, server and client networks, peripheral devices are customarily connected to a data processing device, usually a PC, laptop, or a server in a network environment for example. Peripheral devices as used herein shall mean devices connectable in a data-transferring manner to a processor. Such peripheral devices can include devices such as printers, monitors, keyboards, pointers, such as a mouse, docking stations, personal data assistants (PDAs), image capture devices such as scanners and digital still and motion video cameras, wireless connection devices, and data storage devices such as hard drives, zip drives, CD-R and CD-RW drives, floppy drives, DVD and DVD-RW drives, and connectivity enhancing devices such as an external USB hub incorporating a plurality of USB ports, or a FireWire hub, to name a few examples of such peripheral devices. Generally the connection to the data processing device may be direct, or via a network, and can be hard-wired or wireless, though FireWire and other high performance bus devices are currently usually hard-wired.

In this environment of emerging connectivity possibilities, a collection of devices, with associated cords and cables can accumulate around the work area of a user of a data processing device, for example a desktop or laptop computer, and making all the desired connections can be problematic. This sometimes can be inconvenient to the point of being irritating for a user. This situation is particularly complicated by addition of devices more recently made interconnectable with processors such as a personal computer, and which the user will want to connect. Examples include PDAs, wireless devices such as cell phones and other wireless communication devices, media players, such as DVD drives, portable digital audio storage and playback devices, such as CD and MP3 devices, and other devices as noted below. It is likely that other digital devices, yet to be made connectable, will eventually become so. Such devices may themselves include a processor of some kind, but in this discussion the salient point is that it is desired to connect them with a PC, network server, or laptop, or the like, in a specific environment.

Navigating a collection of cords and cables emerging from the rear of a PC, for example, and finding ways to accommodate connecting the desired peripherals and other devices can be a source of the inconvenience mentioned, and there is good reason to consolidate these where possible. This is particularly true when you consider that both power and data connections, and therefore such cords and cables respectively, are usually involved with respect to each device. Moreover, often the processor is placed where it is inconvenient to reach and difficult to connect such device cables. Accessing the back of a PC when placed on the floor, or under, or in, a desk, or in cupboard designed to receive one, can be difficult. Particularly, when the back of the PC is not accessible without pulling it out, or moving the desk, this difficulty can be very frustrating.

Moreover, there are situations where a processor, such as a PC or a network server, is located in a remote location such as a different room. In a conventional network, shared resources such as the server, printer(s), scanner(s), etc. can be, and typically are, located at remote locations; and are connected by a hard-wire or wireless connection scheme. This can be desirable, to reduce costs, or to isolate the processor. Isolation of the processor can be desirable when, for example, its cooling fan is deemed too noisy for the user location, or a specific area for shared resources is desired, such area being specially adapted for location of the processor. Another example is where the environment at the user(s) location(s) is/are potentially damaging to the processor due to temperature, humidity, or particulate content of the air. In this scenario, convenient connectivity is difficult as the ports which may need to be accessed (let alone some user interface device like a disk drive or scanner) are in a different room.

Moreover, it will be appreciated that the fact that devices are connectable does not mean that it is easy, or in some cases, even possible, to do so. There can potentially be a situation where it is desired to connect a device to a processor, but there is simply no convenient means to do it, because for example there are not enough USB ports on the back of a PC, or the connectors themselves are incompatible. Moreover, there may be a point where it is not convenient to add even one more device to a Gordian knot of wires and cables coming from the back of a PC or otherwise disposed around the work area; or to be required to repeatedly connect and obtain power for yet one more device in a mobile office environment which is repeatedly set up and connected, and then disconnected and packed away.

By way of further background, and to be clear and consistent, generally when referring to a "device" herein, one connectable to a data processor and/or itself having an electronic data processing or transfer capability is meant, unless from the context, it is clear that some other meaning should be inferred. As will be apparent from the foregoing background discussion, such devices can nevertheless encompass a wide variety of types. These will include those conventionally thought of and designated as computer "peripherals", such as keyboards, printers, monitors, scanners, and external data storage devices, for example. Such devices will also include other devices such as digital image capture devices such as digital cameras and camcorders, digital image projectors, media devices such as DVD players, CD players, MP3 players, and other devices for processing data comprising visual and auditory information, communications devices including wireless communication devices, including telephones, also modems, USB and FireWire bus hubs, and the like, PDAs, and small hand-held computing devices, field data collectors, navigational and global positioning devices, and other devices which generate, use, or transfer data. Microphones and speakers, and other analog drives conventionally thought of as peripheral devices will include a A/D conversion and processing capability, e.g. a sound card, and are included with this understanding. Also included are devices which consolidate, compress, expand, archive, and otherwise manipulate data and store or transfer it from storage. These can include floppy, ZIP and tape drives, hard drives, optical data storage devices such as CD-Rs, CD-RWs, DVD-Rs, DVD-RWs, and the like, as well as external RAM and RAM flash storage to name a few examples. When speaking of a "device," these kinds of devices, and such kinds in a variety exemplified by the foregoing, are contemplated. When speaking of a "peripheral" a device in accordance with the foregoing, connectable with a data processor, is contemplated. Thus it is intended that all devices connectable, other than the processor and working memory of a computer be included.

In contrast, when speaking of a processor, or data processor, or server, a device acting primarily as processor of data is contemplated, including working memory required for the task. This is true whether or not the device as packaged includes additional memory and storage devices such as hard drives, or other things; a conventional PC, laptop computer or a conventional server in a network being three examples.

In speaking of a "system," a set of devices, which can include a processor, operatively connected, and/or connectable, to facilitate transfer of data is contemplated. The system can include devices hard-wired together, and also can include wireless connections, networked and not networked.

With these background discussions, it will be apparent that connecting numerous devices to a processor can be problematic, yet interoperability and connectivity are goals which, if realized, enhance, even leverage, the usefulness and productivity of a system. As mentioned, particularly where it is necessary or desirable to place the processor in a location where connections are inconvenient; or, it is inconvenient to have numerous devices collect about the work area of a user; or, to manage the numerous cords needed to provide data connections and power connections; or, there is simply no convenient way to connect devices, improvements in systems to mitigate these problems will aid in realization of these goals of increased usefulness of systems.

SUMMARY

It has been recognized that consolidation and interconnectivity of devices is desirable, for at least the reasons mentioned above. The invention accordingly provides a connectivity system, comprising a peripheral device as part of a data processing system wherein the peripheral device as packaged incorporates at least two data connections. These data connections are configured to connect the peripheral device to at least two other devices simultaneously. This allows transfer of data between these two connected devices when so connected. A power connection is also incorporated in the peripheral device enabling at least one of the connected devices to be powered from the peripheral device when connected.

In a more detailed aspect, this system allows a data connection, as well as provision of clean, that is to say, filtered, converted, even customized, power at a selected voltage to a connected device. In a further more detailed aspect, the peripheral device can be one ordinarily provided for user interface with the system, and is therefore conveniently located for access by the user. For example, a printer, a laptop docking station, a scanner, a client device in a network, a keyboard, and a monitor can comprise such readily accessible peripheral devices.

In a further more detailed aspect, a case of the peripheral device can be configured to provide convenient connections for power and data connection of another device, which can be another peripheral, either by connection to a port, or incorporation of a cradle in the peripheral device, to conveniently receive the connected device. Case modules, each providing for power and data connection of another device, and conveniently connectable to the peripheral device case, can be provided. In this later aspect, the system can be customized repeatedly by a user to add or delete devices in such modules without making additional connections beyond physically connecting each module desired. For example, modules can slide into bays having powered data connectors or can snap to or otherwise removably connect to the exterior of the peripheral device and/or each other, enabling several to be stacked together, each containing a power connection, and a data connection, such as a USB or FireWire or other serial or parallel connection for example. This will enable addition of devices by simply snapping on to the peripheral device case, or on to a previously connected module, and in effect allowing selected devices to be conveniently daisy-chained on a bus by simple addition and/or subtraction of device modules as desired.

In a further more detailed aspect, a connected device or devices can be simply incorporated, or "bundled" with the peripheral device in the same case. The data and power connection are located within the case in this situation. While interchangeability is not a feature in this implementation, consolidation of peripherals, and convenient access made possible by the combined smaller footprint enabling desktop positioning, are nevertheless desirable features.

In another more detailed aspect of the invention, it will be appreciated that the peripheral, a printer being one example, is connected to one data processing device, such as a personal computer, or a number of data processing devices via network, and is simultaneously connectable to another data processing device via a cradle or bay which incorporates both a power port and data port, or by a cable connection to a power port and data port provided on a peripheral device (so that the processor need not be accessible in order to make a convenient cable/cord connection), or by the modular approach just discussed.

In a further detailed aspect, the case of the peripheral device can incorporate a plurality of connection capabilities. It can comprise at least one portable device cradle, and/or at least one power and data connection port incorporated in a case enclosing the peripheral device, and/or incorporate bays for receiving slide-in device modules, and/or provisions for connecting modules to the exterior, such modules comprising further devices or themselves each including one or bays to accommodate such further devices.

In a further more detailed aspect, it will be appreciated that the peripheral device can be connected to a power source, such as a wall outlet, for example, and can further comprise a power supply which provides filtered, regulated, surge protected, converted, stepped down, or otherwise appropriately conditioned power, not only to the peripheral device itself, but also to a connected device as mentioned. There is an economic advantage of little additional cost for providing this power connection, as the power supply already necessarily exists on such a peripheral device, connectable to a power source as mentioned, or to another power supply.

In another more detailed aspect, a cradle for receiving a connected device which can incorporate both data and power ports can be incorporated in a case of the peripheral, or can be a separate device connected via a cable to a peripheral device. It can be placed by the side, or mounted on the case of, a peripheral device. In a further more detailed aspect, an adapter can be provided, which will allow a cradle configured to receive one device to receive, and provide power and data connections to another device for which the cradle was not originally intended. In another more detailed aspect, a cradle could be standardized, and adapters used for a number of different connectable devices. Furthermore, the adapter could comprise a direct mounting or a cable connection to the device providing power and data connection through the cradle to a device which would otherwise not be cradleable in the cradle due to its size or by reason of other considerations. The adaptor can be configured to mitigate incompatibilities from differences in things such as power connectors, data connectors and/or communications protocols. The adaptor can be fairly simple or include considerable processing capability to negotiate between otherwise incompatible devices.

In another more detailed aspect, a plurality of cradles can be provided with the peripheral device, either built into the case, or connectable thereto by cable connection for power and data transfer. For example, the case of a peripheral deice can incorporate a cradle for a PDA device, one for a mobile phone, and can also further comprise data and power ports for connecting further devices. The peripheral device can have one or a plurality of bays incorporated in its case, and/or in a module connectable under or onto the case, for example, to receive a data storage device, USB or FireWire Hub, DVD-R/W or CD-R/W drive, such as may be used with media devices such as video or audio devices. The system can be configured so that a device such as a video camera, digital audio player, or a data storage device cartridge from such a device can be conveniently connected via the power and data connections to the processor and/or the peripheral device and/or one or more other connected peripheral devices.

In another more detailed aspect, the invention can be implemented in a PC workstation or network environment to provide convenient connection access for one or more peripheral devices on a minimized footprint at a workstation where such access would not otherwise be conveniently available. In one aspect a printer can be combined with further devices in accordance with the forgoing such that the devices, such as data storage media drives for example, are available at the desktop in easy reach rather than at an inconvenient or remote processor location. The user does not have to get to a PC under a desk or in another room to use the drive, for example. PDAs and other mobile devices could by connectable to the processor by a cradle or other power and data connection incorporated in the printer, and even one within its footprint, so that the device can be connected to the processor without accessing the rear of a PC, for example, or running a further data and power cable up onto the desk top work area.

Moreover, in a further detailed aspect of the invention, a hard-wire or wireless thin client network is facilitated by use of a peripheral concurrency device in data transmission-enabling contact with the processor; and which, when combined with hardware/software at the server, such as a PCI card, facilitates concurrent use of the resources of one powerful PC by multiple users at thin clients. The concurrency device is bundled with another device such as the monitor or keyboard or a wireless transceiver device, and has a data connection to link the processor and the other device, as well as a power connection. In a further detailed aspect in a wireless environment the bundled concurrency device can supply power or share a power supply with a wireless transceiver device and/or a monitor, keyboard, and/or mouse, and/or other connected peripheral device at the thin client location. In this more detailed aspect, a system where one PC comprising the processor is connected to a multiplicity of peripheral devices at discrete thin client sites is economically implemented.

Further features and advantages of the invention will be appreciated with reference to the following detailed description, taken in conjunction with the accompanying drawings, which illustrate, by way of example, such features and advantages.

BRIEF DESCRIPTION OF THE DRAWINGS

FIG. 9 is a right front perspective of another embodiment of the invention implemented in a printer;

FIG. 10 is a right front perspective of another embodiment of the invention implemented in a printer;

FIG. 10a is a right front perspective of a paper-tray cartridge implementation of the invention in the embodiment of FIG. 10;

FIG. 11 is a schematic diagram illustrating another embodiment of the invention.

DETAILED DESCRIPTION OF THE PREFERRED EMBODIMENT(S)

Figure 1:
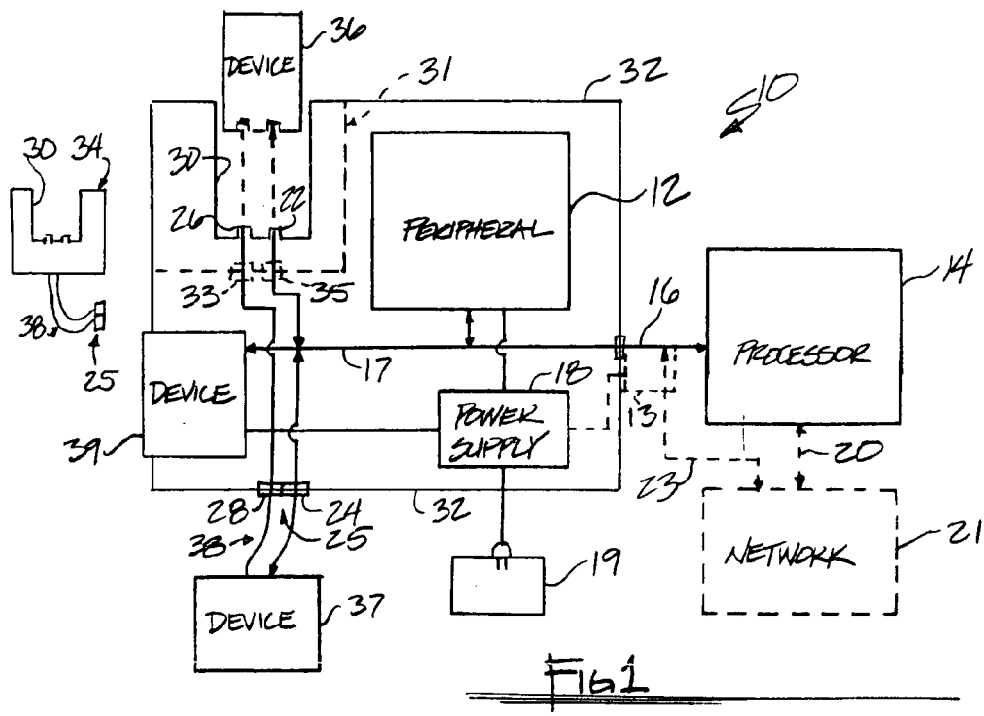
FIG. 1 is a schematic diagram illustrating an embodiment of the invention.

With reference to FIG. 1 of the drawings, which are given by way of example, and not by way of limitation, the invention is embodied in a connectivity system 10 including a peripheral device 12 which is connected to an electronic data processing device 14 by a data connection 16 which can comprise a data port, such as a USB port, other serial or parallel port, or a FireWire connection. The peripheral receives power from a power supply 18 connectable to a power source 19 such as an alternating current wall outlet, or a direct current power supply device, or an un-interruptible power supply (UPS), etc. As mentioned above, the electronic data processing device 14 can be one of a number of different devices, but typically will be a personal computer, a server, or a laptop personal computer, to name a few examples. The processor can be connected via a hard-wired or wireless connection 20 to a network 21, which can include one or more additional networked electronic data processing devices. Alternatively the peripheral can itself be connected to the network 21 via a data link 23, and again this can be a wired or a wireless connection.

In this embodiment the peripheral device 12 also has associated therewith at least one further data connection 17 coupled to the data connection 16 mentioned above, and can comprise a further extension of a USB, FireWire, or other serial or parallel bus or connection. It is accessible by at least one further data connection port, for example at least one of two illustrated data ports 22 and 24, and at least one additional power connection, accessible for example at power ports 26 and 28. These can comprise connections incorporated in a connector 25 configured to receive a complementary connector of a cable (such as 38 described below), or connectors for separate data and power cables. This connector can be incorporated in a case 32 enclosing the peripheral device. In another embodiment the power and data ports, 26 and 22 respectively, can be incorporated in a cradle or bay 30 incorporated in, or otherwise integrally connectable to, the case 32. In one embodiment a module 31 incorporating the cradle or bay can in one embodiment be made removable, by provision of appropriate connectors 33, 35 for supplying power and data transmission capability to the power and data ports 26, 22 and enabling connection to the power supply 18 and the peripheral device 12 and processor 14 via the data connection(s) 16, 17, in one case being for example a USB, FireWire, or other serial or parallel data connection extending from the processor through the case 32 of the peripheral 12 to the connectors 22, 24.

In another embodiment, the case 32 and connectors 24, 28, 33, 35 comprising data and power ports can be configured to allow connection of a stand-alone cradle or module 34 to the power supply 18 and peripheral device 12 via such power and data ports. Further, in one embodiment the data connection to the processor 14 or network 21 can be via a wireless transponder as described below.

The said at least one further data port, 22 or 24, and power port, 26 or 28, provided enables connection of at least one further device 36 and/or 37. This can be by means of insertion in a bay or cradle 30 in one embodiment, or by connecting to the data port 24 and power port 28, using a cable connection 38.

In another embodiment the peripheral 12 and processor 14 can be connected within the case 32 to a further device 39. For example, disk drives, USB or FireWire port hubs, CD-R/RWs, DVD-R/RWs, or other devices, can be connected to and integrated with the peripheral in the case 32. In another embodiment, a plurality of such devices 39 can be provided, each being connected and mounted within the case.

Not by way of limitation, but to better illustrate principles of the invention, in one embodiment the peripheral device 12 can comprise a printer. The printer is conventionally connected to a processor device 14 or to a network by conventional connection such as USB or FireWire, other serial or parallel connection, exemplified by the illustrated possible connections at 16 and 23. The device 39 and/or cradles or bays 30 for the devices 36, or connector ports for a cradle 34 or further device 37 connections can be located underneath the printer, on the side, top, etc. In one embodiment, the bay 30 can comprise a secondary paper tray slot, and one or a plurality of devices or further bays can be incorporated in an adapter (not shown) slid into the slot, which adaptor connects to the power and data connections at the back of the slot when the adaptor is seated.

In another embodiment the data connection 16, 23 between the peripheral device and the processor 14 or network 21 can also comprise hardware comprising a device 13 for wireless data transmission. This way the wireless hardware can be powered from the power supply 18, and would itself comprise a further device connectable to the data connection 16,17 and power supply.

The other data port and power port, 22, 26 or 24, 28 provide a further data connection such as a USB or FireWire or other serial or parallel connection enabling data transfer between the devices 36 and/or 37 and the processor 14 and/or network 21, and supplies a clean (converted, filtered, modulated, regulated, surge-suppressed, etc.) and/or otherwise customized power to the device at a desired voltage, for example a standard 12 volts. In one embodiment the power connection can actually comprise connectors for two voltages, such as 5 volts as well as 12 volts, so that chip devices can be directly connected. Allowing such connection of another device 13, 36, 37, 39, etc, each of which can be one of a great variety of possible devices, as discussed above, can reduce inconvenience as the connection ports or ports, typically accessible only with difficulty at the back of the processor 14, need not be accessed. The connection is moved up onto the desktop or other accessible location where the printer 12, by dint of the necessity for frequent convenient access by a user, is located. Also, at least one power cord is eliminated; and even if a cable 38 connection is used, it can be a short cable and does not have to be threaded to the processor and/or add to the cable clutter coming from the processor and any associated AC power connection provisions, such as a power strip typically employed.

As mentioned, a cradle or bay 30 is provided. This comprises a convenient location for connecting a mobile device 36 such as a mobile phone, PDA, or a digital image capture device, and can be configured to provide a convenient location for connection to the processor 14 and/or network 21, and for recharging. In the case of an image capture device the data connection can be peer-to-peer directly to the peripheral 12 in the case of a printer, to print images downloaded from the device 36. Other embodiments of the device 36 include, but are not limited to, digital audio devices, mobile phones and other wireless communication devices. In another embodiment, a bay 30 can be configured to interchangeably or selectively receive devices, including data storage devices such as floppy, hard disk, and zip drives, communication hub devices such as a USB or Firewire hub (enabling convenient connection of even more devices at a more accessible location), CD-R and CD-RW devices, DVD-R and DVD-RW devices, to name a few examples.

In other embodiments the peripheral device 12 can comprise one of many other devices which are conventionally located convenient to a user. For example, the peripheral can be a laptop docking station, a monitor, a keyboard, a scanner, a thin client data communication device as a workstation, an external drive such as a floppy, zip, CD-R, CD-RW, etc. The salient point is that such a peripheral will have a power supply and a data communications capability. These are leveraged in this embodiment of the invention of the invention to provide more convenient and flexible functionality of the system 10 by providing convenient connection of other devices thereto. In a USB environment, for example, any or even all of the devices conventionally located convenient to a user such as a monitor, a keyboard, a mouse, media players and storage devices such as CD-R, CD-RW, floppy, zip, etc., a printer, a scanner, etc, can be potentially connected to a processor 14 through one of said group of devices, provided it has first 16 and second 17 data connections; and further, it or they can be powered without a need for extra AC power cords if a power port or internal connection which is connected to an appropriate power supply 18 is provided.

In one embodiment provision is made for insuring that an incompatible device 36 or 37 is not connectable. This can be important in making sure the power supply 18 is not damaged by a device having incompatible power requirements, or that the user will not be disappointed because the device physically connects, but the system doesn't work as expected because of an incompatible data transfer connection 17, or for some other reason. This can be done by customizing the cradle or bay 30 and/or the connectors 22, 24, 26, 28 to physically connect only with likewise customized compatible devices. The shape of the device 36 or connector 25 acts as a "key" enabling compatible connection and disabling other connections. Alternatives to this include, but are not limited to, a software implementation of the "key" enabling detection of compatibility or incompatibility of the device and disabling the power and/or data port connections if an incompatible device is connected. A signal or message to the user can also be provided indicating incompatibility. This "key" idea can also be implemented by an imbedded electronic key (not shown), such as a transponder or other coded hardware device in the device 36, or cable connector 25, etc. which interacts with a counterpart in the cradle or bay 30 or other connection location to detect compatibility or incompatibility.

Returning to discussion of possible configurations of the system 10, the connectable device 36 or 37 can be a digital audio or visual reproduction device; and as mentioned above, can comprise a variety of deices such as a digital video or still camera, a microphone, an digital audio player device, a CD, or other sound and/or video recording/playing device which is configured to produce a digital output signal useable by the processor 14. The connectable device can itself comprise a video monitor or projector or sound card and speaker or otherwise have an audio or video output capability, and thereby enable data from the processor 14 or another device connected to the system to be used to produce a video or audio output to a user through the connections provided by the printer 12.

As an aside, the connectable device e.g. 36, 37, can be a wireless connection device (like 13) linking to a further device, such as another computer, a keyboard, a mouse, a monitor or projector, or home stereo system, or other output device or system, to accomplish the same result.

In another embodiment where the device 36, 36 is a wireless connection device, the system 10 can be configured so that device can take the place of the data connection 20 of the processor 14 to a network 21. In another embodiment, it can enable another processor (not shown) or other device (not shown) to be connected to the network through such a wireless device. In an integrated data bus sharing system such as in a USB environment, the wireless connection simply replaces wires at the desired location. As will be appreciated including a wireless connection in a high speed bus application such as FireWire will introduce a bottleneck to devices connected to the FireWire bus via the wireless connection. But it is nevertheless possible to do, though the communications speed of the high performance bus is compromised as to those devices due to the wireless connection between them and actual bus hardware.

In another embodiment, the transfer of the data can be from the connected device 13, 36, 37, 39 into the connectivity system 10, and to a connected processor device 14 or another networked device 20. As an example, if the connected device is a USB Hub, an MP3 or other digital audio player is connectable through a part of the hub to the processor, assuming sound reproduction capability on the other side, i.e., a soundcard and speakers to take the data and convert it to a audible audio signal, or a further connection to a digital audio device in a separate stereo system, sound reproduction can result.

As mentioned, the device 36, 37 can be a communications hub, such as a USB connections hub incorporating a plurality of connection ports, a SCSI hub or a data switch device, or another hub for multiple connections to a different serial or parallel connection bus, allowing convenient connection of a number of different additional devices, such as cameras, MP3 players, etc. Moreover, the power connections can be provided adjacent the data connections in such a hub device, the wiring being taken though such a hub as well to the power supply 18, thereby making the device 36, 37, 39 a repeater of the functionality of the peripheral device to enable one or a number of additional devices (not shown) to be connectable in data transferring fashion to the system 10, and also be powered from the power supply 18. As an example of the foregoing, configured in this way the system can be designed to handle connection and also powering of a plurality of USB compatible devices, such as digital cameras and other image capture devices, digital audio players such as MP3 devices, CD-R and CD-RW, DVD-R/RW drives, other mass storage devices, mobile phones and other wireless communication devices, and additional compatible devices of which the foregoing are only a few examples. An advantage of this configuration is that it moves these connections away from the processor 14, such as a personal computer or network server device, and accordingly provides an opportunity to reduce the number of cords, clutter, etc. at the location of the processor; and/or to reduce the need to access the processor, such as a PC to make necessary connections, or to insert or retrieve disks, etc, which access may be inconvenient.

It should be noted that it is contemplated that the system 10 will facilitate peer-to-peer data transmission. Connection of an image capture device 36 or 37 directly to a printer, in this case the peripheral 12, was mentioned above. Communication between connected devices 36, 37, 39 and other networked devices besides the processor 14 is also contemplated. USB and FireWire are possible bus implementations, and other devices and data transmission modes, serial or parallel are possible; for example a high performance bus such as a fiber channel arbitrated loop (FC-AL) bus is possible as well, but currently involves higher cost. In any case, if a connected device 36, 37, 39 is itself a connectivity enhancing device, the result can be further extending the connectivity capabilities and ease of use of the system 10, for example by enabling other devices to be daisy-chained into the system 10.

Turning again to details of implementation, in one embodiment, the cradle or bay 30 is incorporated directly into the case 32 of the peripheral device. In the embodiment where a separate connectable module 31 is provided, this can attach underneath, to the side, on top, back, or front of the case.

Figure 2:
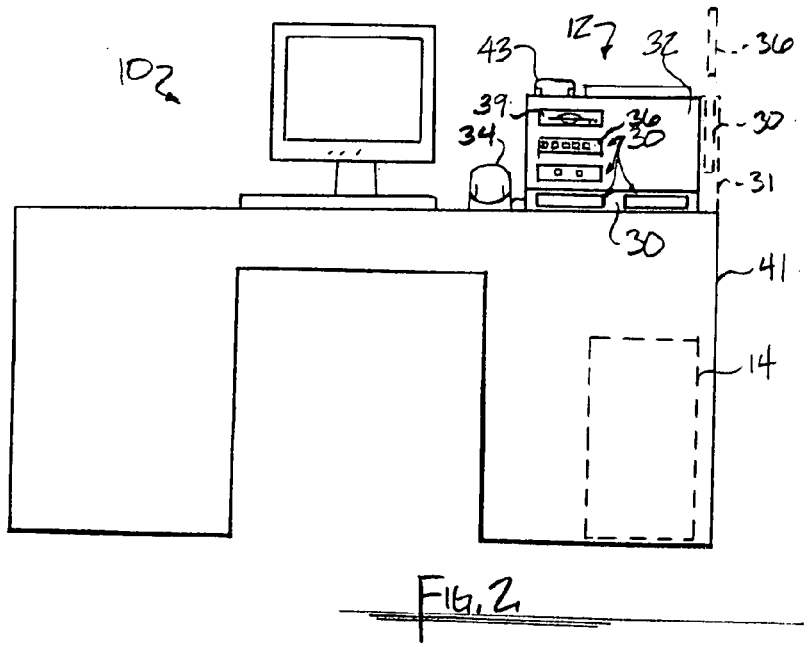
FIG. 2 is a schematic elevation view of a work area showing one of numerous possible implementations of the embodiment shown in FIG. 1.

One example, of many possible implementations, is shown in FIG. 2. A processor 14, comprising a PC is incorporated in a desk 41. A peripheral device 12 such as a printer in the example, sits on the desktop, and incorporates cradles or bays 30 for connection of devices (36 in FIG. 1), a connector for a stand alone device (37 in FIG. 1) such as a PDA syncing cradle, cell phone cradle or a camera cradle 34, and an incorporated device 39 such as a mass storage device (floppy, CD-RW, Zip, etc. drive) or USB hub, etc. A cradle 43 for a mobile device such as a telephone or PDA can be incorporated in the case 32. A connectable module 31 can provide a further cradle or bay 30 or a plurality of same. A user can conveniently connect, interchange, and remove connected devices without having to access the back of the PC. This is in contrast to the conventional way such provisions are made, involving sliding the desk away from the wall, sliding the PC out of the desk far enough to access the back (which can be difficult if cord length limits such movement), or at the very least crawling down around and behind the desk to make the needed connection(s).

Figure 3:
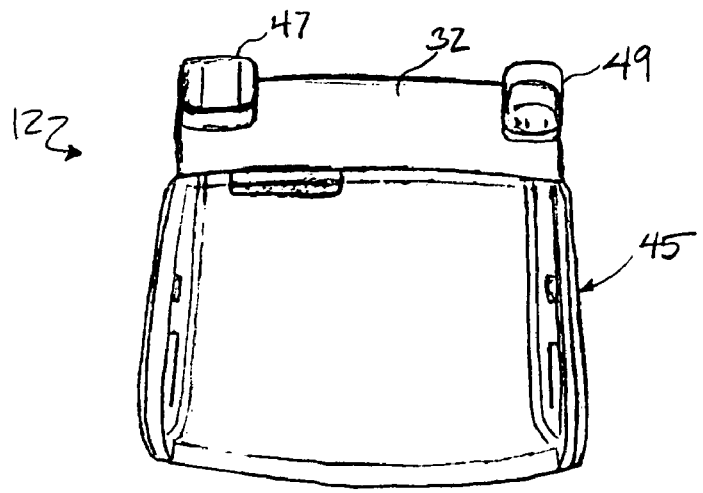
FIG. 3 is a top front perspective view of another embodiment of the invention in a docking station.

With reference now to FIG. 3, the peripheral device 12 can comprise a laptop docking station 45 which can further incorporate a mobile device cradle 47, such as a PDA synching cradle, and a mobile telephone cradle 49. This embodiment is particularly suited to simplify implementation of a home location of a mobile office including mobile computing, communications, etc. The cradles can be separate elements mounted onto the docking station, with power and data connections similar to that of case mountable element 31 in FIG. 1, or can be incorporated fully as unitary portions of the case 32 of the docking station.

Figure 4:
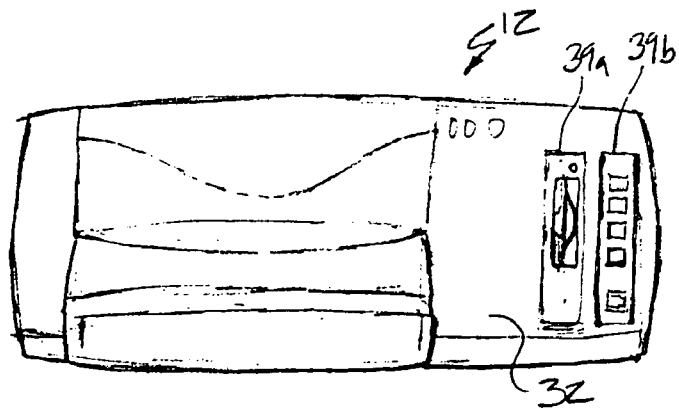
FIG. 4 is a front elevation view of another embodiment of the invention implemented in a printer.

With reference to FIG. 4, in another embodiment the peripheral device 12 can comprise a printer having further devices 39a, 39b incorporated in the case 32. In the illustrated embodiment the further devices comprise a disk drive and USB hub, respectively, but as will be appreciated they each can be any one of a number of devices such as the examples given herein. As will further be appreciated, where a connection hub such as the USB port hub shown is incorporated, a number of further devices can be conveniently connected to the processor (not shown) at the desktop location of the peripheral, rather than at the processor such as a PC. It will be appreciated that the leveraging of connectivity enabled by this embodiment can be very useful. For example, an image capture device such as a digital video camera, a further mass storage device (not shown), and two or more additional devices (depending on how many ports are incorporated in the hub) can be connected simultaneously. In this example, digital video data can be transferred to the processor, to the connected mass storage device, to the printer to print out a still image, etc. The connection can to the printer and mass storage can be via the processor or peer-to-peer, depending on the particulars of the devices connected.

Figure 5:
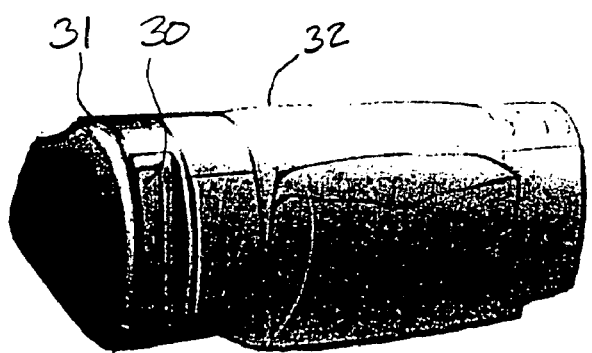
FIG. 5 is a left front perspective of another embodiment of the invention implemented in a printer.

With reference now to FIG. 5, in one embodiment a bay 30 which can accommodate one of a number of further devices (36 in FIG. 1) is embodied in a module 31 attached to the case 32 of a peripheral device 12, in this case a printer. The devices connectable will be packaged to fit into the bay, either semi-permanently, or in another embodiment in a cartridge-like fashion, enabling rapid change-out. The provision of power and data connections as discussed above enables the relatively easy swappable accommodation of different devices in the bay as needed by a user. The convenient placement of the bay at the destktop location of the peripheral further enhances the ease of connectivity and customizability of the system (10 in FIG. 1) for particular needs or preferences of a user.

As will be appreciated with reference to this embodiment and the foregoing discussion, the module 31 could alternatively incorporate a further device (39 in FIG. 1) permanently mounted therein. In this latter embodiment, the module 31 can be swappable to accommodate attachment of different devices to the system (10 in FIG. 1).

Figure 6:
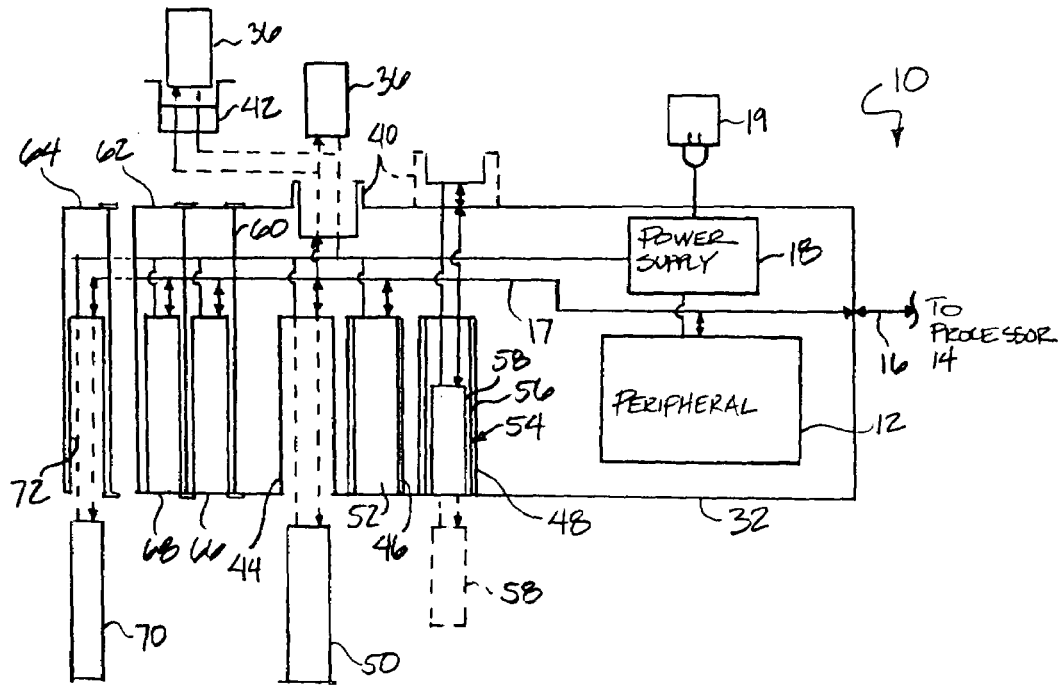
FIG. 6 is a schematic diagram illustrating another embodiment in accordance with the invention.

Turning now to FIG. 6, in another embodiment of the system 10, the peripheral device 12 again has a case 32 incorporating or carrying a cradle 40. Here the cradle can be made to accommodate more than one kind of device 36 in the cradle, by a provision of an appropriate adapter 42. As an example, the cradle can be standardized, and a unique adapter provided for each of a number of different PDA devices to be received therein. In this way, additional functionality can be provided and compatibility with the power supply 18 and data connection 17 can be assured. The adapter can incorporate circuitry (not shown) for conversion, as needed, to facilitate a change in the power if required, and to protect the power supply of the peripheral. It can incorporate an adapter/translator for data transmission if otherwise incompatible systems are used, such as when a translation from one protocol to another is required.

As will be appreciated, in one embodiment more than one cradle can be provided. For example it may be desirable to have a PDA syncing cradle, a mobile phone or other wireless connection device cradle, which can provide a wireless connection to a network, a digital image capture device cradle for video or still cameras, or a flash memory module cradle, to name a few examples. This would be an alternative or supplement to the concept of using a standard cradle and adapter as discussed above.

Figure 7:
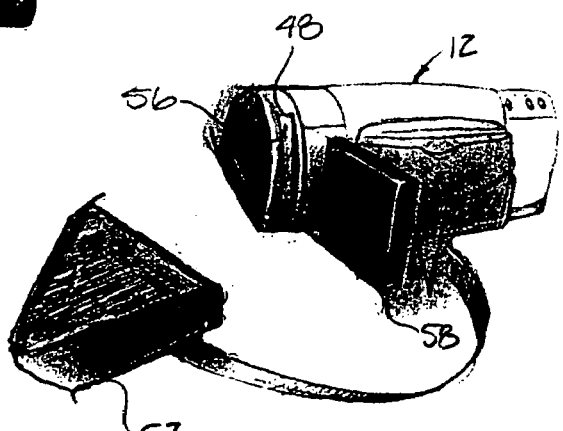
FIG. 7 is a left front perspective view of another embodiment of the invention implemented in a printer.

In another embodiment, the case 32 can include one or more bays 44, 46, 48 configured to interchangeably receive devices 50, 52, 54 as described above, including devices such as zip, CD-R, CD-RW, DVD-R, DVD-RW, floppy, tape, and hard disk drives, USB, parallel, and FireWire port hubs, flash memory readers, digital audio/visual ports, to name some examples. The configuration of one or more of these devices can also comprise an adapter analogous to that (42) described above in connection with the cradle 40. For example, one device 54 includes a module 56 configured to fit the standard bay 48, and accommodates a device 58 such as described above, but which, due to its size, power and data connection configuration, etc. would not otherwise fit in the bay. As an example, with reference also to FIG. 7, a swappable CD-R, CD-RW or disk drive device insertable in a notebook computer 57 can be accommodated in a larger bay 48 by means of this configuration.

Returning to FIG. 6, in another embodiment one of these further devices 50, 52, or 54 can be a connectivity leveraging device enabling convenient connection of additional devices. For example a device comprising a connection port and an Ethernet card or other intra-networking card can be installed. This connection can comprise the means of networking the system processor 14 with other devices or networks. In one embodiment, for example such a networking scheme could be used to quickly and conveniently connect the processor 14 of the system 10 with a laptop (not shown) on the same desktop location as the peripheral device 12. As will be appreciated the connection is made without having to pull out or otherwise access the processor to install a networking card or connect cable to a card previously installed.

Figure 8:
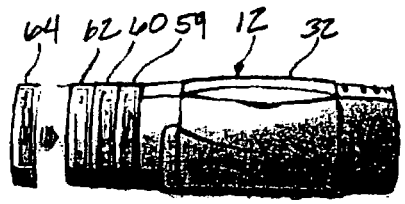
FIG. 8 is a front elevation view of another embodiment of the invention implemented in a printer.

With reference now to FIG. 8 as well as FIG. 6, in one embodiment the data and power connections for adding additional devices to the peripheral device 12 can be by means of one or more attachment modules 59, 60, 62, 64. These can be standardized, and configured to connect in a stackable manner to the case 32 of the peripheral 12. This allows modules to be added as needed or likewise deleted, by adding or removing one or more standardized modules. Each module can incorporate a device 66, 68, 70. This can also be accomplished by providing a standardized bay 72 in a module and allowing standardized devices to be connected by insertion in the bay, such as the swappable drive example given above.

With reference to FIG. 9, in another embodiment a module 64 attachable to the case 32 of the peripheral device 12, in this case a laser printer, is attachable underneath the printer and so does not increase its footprint area. As before discussed the module can incorporate one or more further devices 68, and can incorporate one or more bays 72 configured to interchangeably accept another device 70.

With reference to FIGS. 10 and 10*a*, in another embodiment a device module 56 is made to fit into an auxiliary paper tray of the printer 12. One or more devices 58 is mounted in, or intsertable in a bay of, the module configured to be received in the paper tray. Power and data connections, not shown in this figure, are provided in the paper tray slot on the back or a side to match corresponding connections on the device module so that power and data connections to the one or more devices carried in the device module are connected when the module is inserted in the paper tray.

As can be appreciated with reference to FIGS. 9 and 10, the possible embodiments of the invention are quite numerous. The invention can provide the advantage of convenient connectivity without great cost in terms of additional space required; and, for the reasons given above, at a favorable cost compared with other implementations.

Turning to FIG. 11, in one embodiment the invention is helpful in configuring the system 10 in implementation of a hard-wired or wireless network where the peripheral 12 can comprise a thin client device connectable to user interface devices, for example a monitor 74, keyboard 76, mouse 78, and to a data storage drive 80 such as a floppy, zip drive, CD-RW, etc. Power and data connections to a wireless communication device 82 or 84 enable connection to a processor 14 comprising a PC or server likewise equipped with a wireless communication device, or directly to the Internet or another network 21. The processor is connected to other thin clients via wireless or wired connections, and can be connected to a further network 21. For example the further network connection between the processor and network can be to the Internet via a DSL or other high speed telecommunication line connection. In one embodiment where the connections are wireless, the wireless connection between the thin client and the processor 14 acting as a server, or between the thin client and a network server in the network 21 can be via a wireless communication device carried in a module 86 connectable to the case 32 of the thin client device. Otherwise the wireless communication device can be connectable via a cable or incorporated integrally within the case 32. The power and data connections are as provided in the other embodiments described above. The wireless communication device 82 or 84 is powered from the power supply 18 of the peripheral device 12, and further, data connections are provided to the monitor 74, keyboard 76, mouse 78 and to the mass storage device 80, and in one embodiment one or more of these devices can be connected to and powered from the power supply 18 associated with the peripheral device comprising the thin client device in this embodiment. As will be appreciated, these further devices are also peripherals, and the configureation could be rearranged so that the power supply was embodied in one of them, for example the monitor 74 which would then serve as the peripheral 12 in the scheme rather than the thin client device.

In one embodiment the peripheral 12 comprising a thin client device, enables the system 10 to be part of a home or office network where one powerful PC acts as a server for the network. Such a system can use a concurrency technology to enable the thin client device, and such concurrency systems allow a plurality of users, at least one of which is at a thin client work station to share the resources of one PC. For example the thin client device can comprise a system such as used in a commercially available product called the Buddy B210 available from Austin Federation of Singapore. This is a small hardware device, which, in combination with a PCI expansion card, facilitates multi-tasking of the processor 14 to enable multiple users. This concept can be particularly useful in a home use environment where hard wiring is difficult, and cost is a major consideration, and multiple users can advantageously use a network. Memory and hard disk use is leveraged, as it is shared, and the resources of the processor 14 are more fully utilized.

Also, such a system 10 enables linking a PC conveniently to a home stereo, television, digital music player, CD burner, Web Radio and TV, digital recording and playback devices, security and lighting systems, etc. enabling integration of home systems. In an office environment, the system enables numerous thin clients to share the resources of one powerful PC, which acts as a server, or comprises a purpose built server, and share use of drives, one or more printers, scanners, etc.

Figure 12:
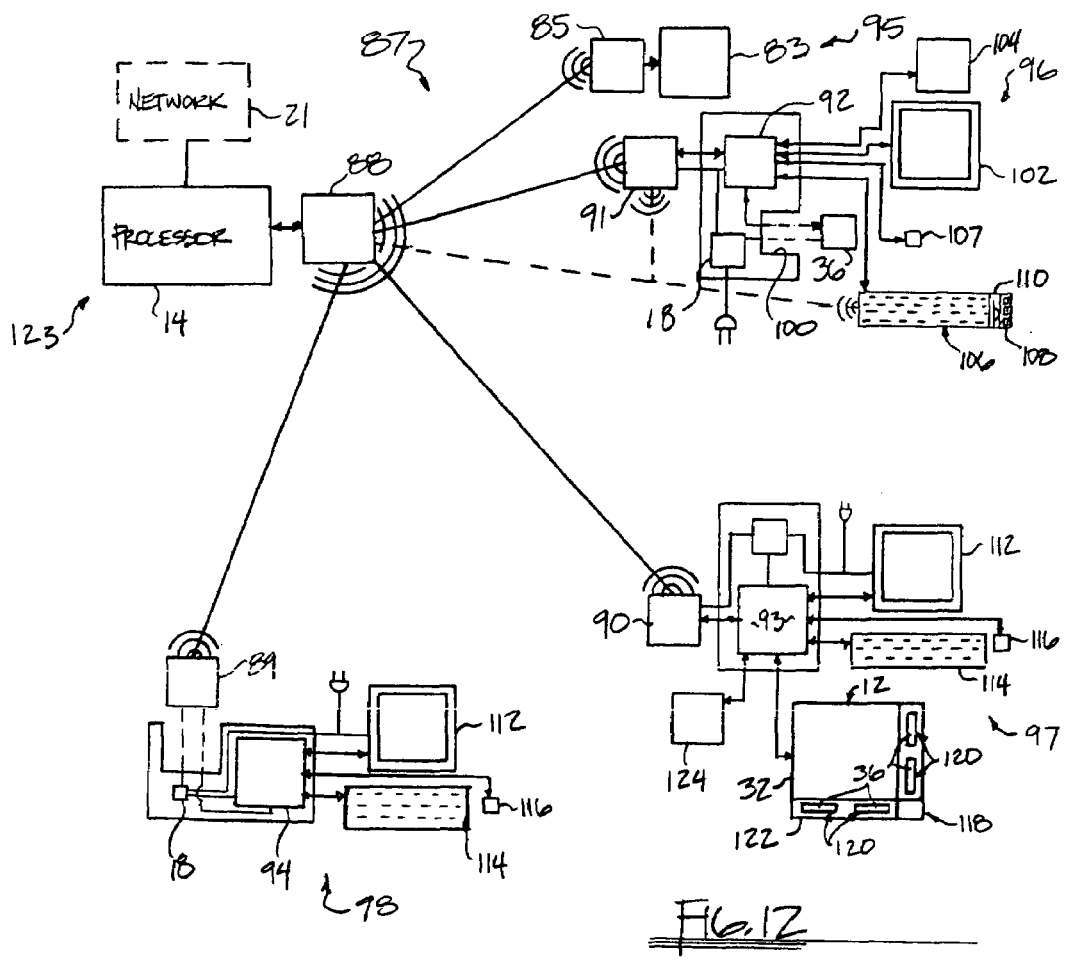
FIG. 12 is a schematic diagram illustrating another embodiment of the invention in a network environment.

With reference to FIG. 12, some exemplary embodiments are illustrated in a networked environment 87. Wireless communication devices 88, 89, 90 and 91 allow connection of a multiplicity of thin client devices 92, 93, 94 at user locations 96, 97, 98 to a server comprising a processor 14. Connection to another system 83 via a further wireless device 85 is also possible. Such further system can be a telephone, security, home energy or lighting management system, or office environmental; security, or timekeeping system, or cash register(s), data collectors, etc. to name a few examples. In an office environment these user locations 96, 97, and 98 conventionally comprise work stations. In a home environment they can be variety of things, for example such as: an entertainment center integrated with the home network, digital video and audio recording devices such as TiVo, Web TV and Radio, digital audio players, CD-R and RW, DVD-R and RW, etc; a kitchen station with simply a monitor and keyboard/pointer; a study or work location much like a conventional PC work area which may or may not have convenient manual access to drives, printer, scanner, etc. as such can be located there or at a central location; and, at another location 95, may comprise another system such as security, lighting, and yard watering systems interfaces as mentioned.

As an examples of possible combinations in such a system 87 at a first user location 96 the thin client device 92 is bundled with one or more bays 100 with power and data ports to enable various additional devices 36 to be connected, including CD, DVD, or other drives, a USB or Firewire hub to connect cameras, audio players, game consoles, or further computing devices, etc. as described above, a monitor 102 which can be a television, a digital video recording device 104 such as a TiVo device, or an internet device such as Web TV, and a hardwired or wireless keyboard console 106 which itself can comprise bays for further devices, add-on modules, or simply incorporate them, for example a USB Hub 108, and a DVD-R/RW or CD-R/RW drive 110. Other devices such as a joystick or pointer 107 can be incorporated in the system at this user location, and, as will be appreciated, this location supports entertainment, gaming, web browsing, etc. and further digital audio, gaming, and other entertainment enhancing devices are natural potential add-ons. As will be appreciated, the location also supports more conventional computing functions as well, and the resources of the network 87 are made available here.

At a second location 97 a thin client device 93 is connected to a monitor 112, keyboard 114, mouse 116, and printer 118. The printer has bays 120 as described above for additional devices 36 to be connected, and/or one or more of the device(s) can be integral with the case 32 and not interchangeable. In one embodiment the printer can sit on an add-on module 122 incorporating bays 120 and/or further devices 36. The module can in another embodiment be an adapter for a paper tray slot, which slot functions as a large bay for the adapter as an alternative to holding an auxiliary paper tray, as described above. As can be appreciated a scanner 124 can also be connected to the thin client device. This configuration supports a home office or a study work location, and all the user interface devices conventionally found at a PC work station can be incorporated in the location 97, for example through the peripheral (in this case the printer) case 32 connection and bundling capability provided by the invention. Alternatively, resources typically shared, such as a scanner can be located adjacent the processor 14 at a server location 123.

At another user location 98 a small footprint is provided by integration of a wireless communication device 89 with the thin client device 94, which can both be carried by the monitor 112 or keyboard 114 case, or can be a small separately cased package. Such a user location will be useful in a space-critical environment such as a kitchen. For example, entertainment, recipes, and Internet connectivity can be provided at this location.

As will be appreciated, easier and more convenient connectivity, enabling an advantageous combination of devices thereby increasing the convenience of use and/or extending the capability and interoperability of a system 10, and enabling lower costs, are possible with systems in accordance with principles of the invention. Devices can be bundled together when sold, and since they share a power supply, this is cost-effective. Novel combinations of devices and configurations of systems are enabled, allowing new and potentially cost-saving, time-saving and more convenient means of implementation of computing in the office, mobile office and in the home.

While features of exemplary embodiments have been shown in the appended drawings and described herein, it will be understood that various modifications can be made without departing from the spirit and scope of the invention. It is not intended that the scope of the invention as set forth in the claims be limited to the examples described, and no such limitation should be inferred.

The invention claimed is:

1. An electronic printer configured to receive a connectable device, comprising:

a printer housing having a cradle configured for receiving a connectable device housing of the connectable device;

a computer connection coupled to the electronic printer, wherein the computer connection is configured to electronically connect the electronic printer with a computer system;

an adapter configured to be positioned intermediate the cradle and the connectable devices facilitating cradling a device which would otherwise not be compatible with the cradle, thereby enabling power and data connection with said connectable device not otherwise compatible with the cradle;

a data connection coupled to the cradle and configured to electronically couple the electronic printer and the connectable device to a computer system;

a power supply coupled to the cradle and configured to supply converted power from an external power source to the electronic printer and to the connectable device, said power supply being incorporated within the printer housing, enabling the connectable device to be physically connected to the printer and to be powered from a same power supply as the electronic printer; and at least one additional data connection port and at least one additional power connection port, whereby in addition to data connection to the printer device, a data connection and a power connection to each of a plurality of further devices is enabled.

2. The system of claim 1, wherein said data connection and said power connection are each made via a cable connection.

3. A system as in claim 1, wherein said connectable device is a PDA.

4. A system as in claim 1, wherein said connectable device is a digital image capture device.

5. A system as in claim 1, wherein said connectable device is a digital audio device.

6. A system as in claim 1, wherein said connectable device is a wireless communication device.

7. A system as in claim 1, wherein said connectable device is a data storage device.

* * * * *

UNITED STATES PATENT AND TRADEMARK OFFICE
CERTIFICATE OF CORRECTION

PATENT NO.        : 7,103,760 B1                      Page 1 of 1
APPLICATION NO.   : 09/907212
DATED             : September 5, 2006
INVENTOR(S)       : Corey A. Billington et al.

It is certified that error appears in the above-identified patent and that said Letters Patent is hereby corrected as shown below:

In column 9, line 24, delete "deices" and insert -- devices --, therefor.

In column 11, line 50, delete "destktop" and insert -- desktop --, therefor.

In column 13, line 6, delete "intsertable" and insert -- insertable --, therefor, In column 13, line 52, delete "configureation" and insert -- configuration --, therefor.

Signed and Sealed this

Thirteenth Day of April, 2010

David J. Kappos
*Director of the United States Patent and Trademark Office*